UNITED STATES PATENT OFFICE.

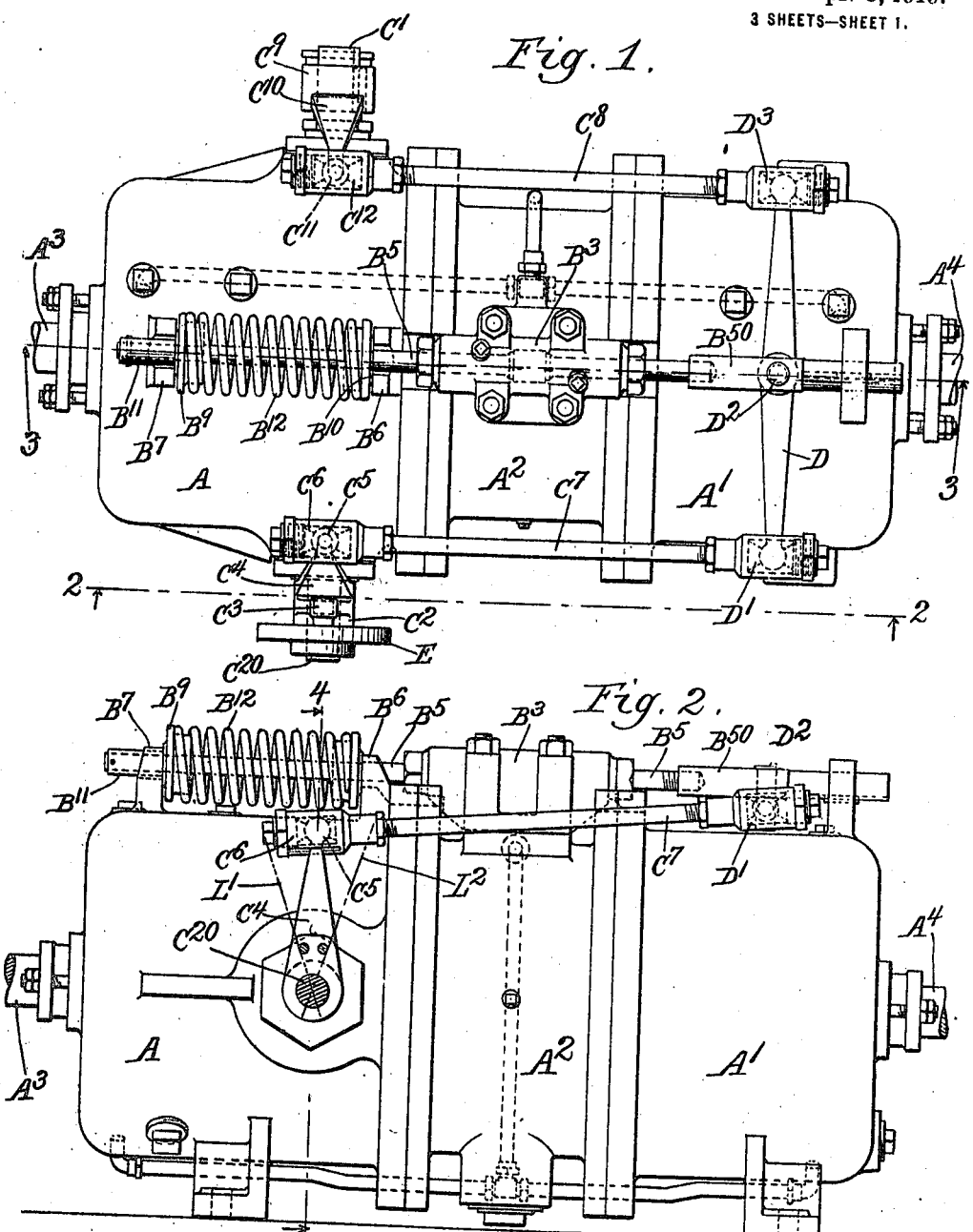

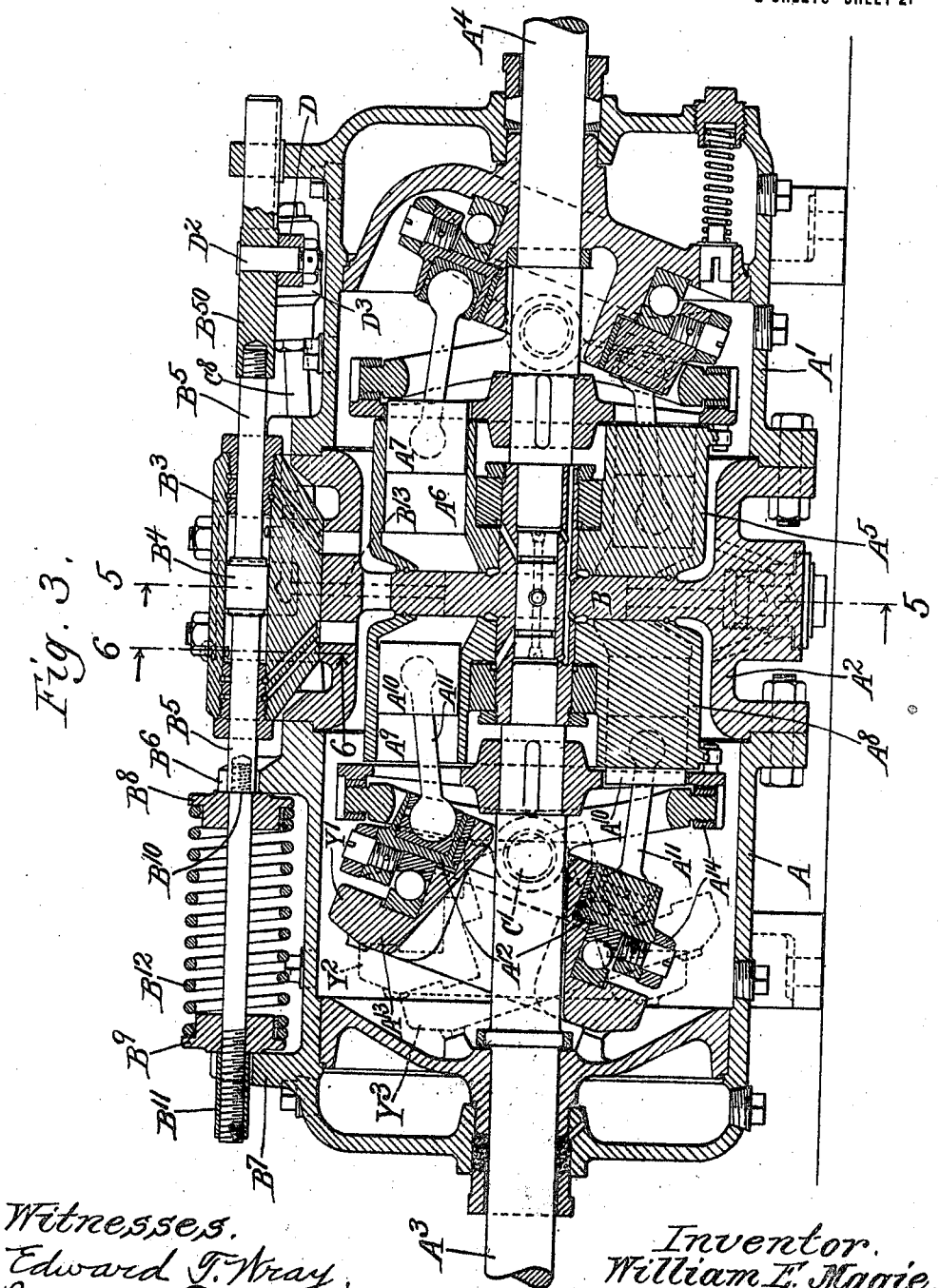

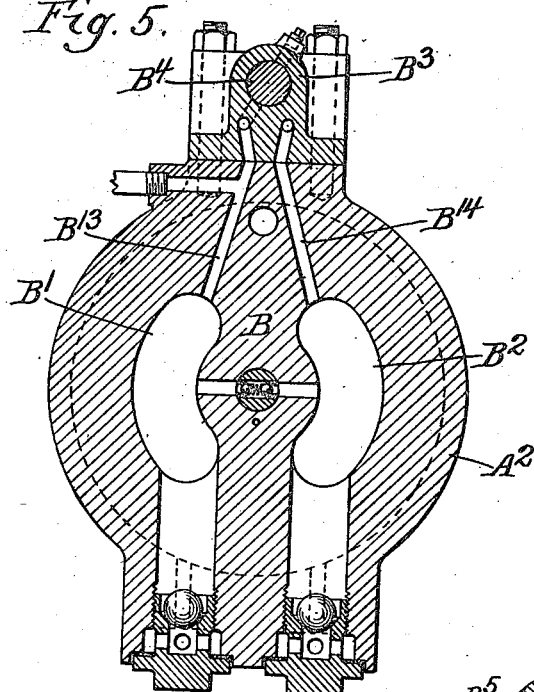
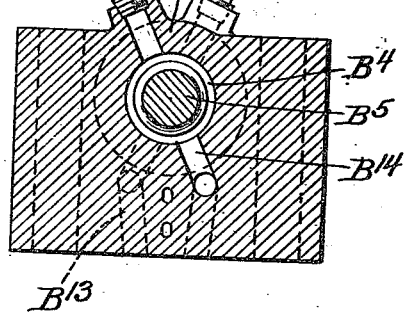
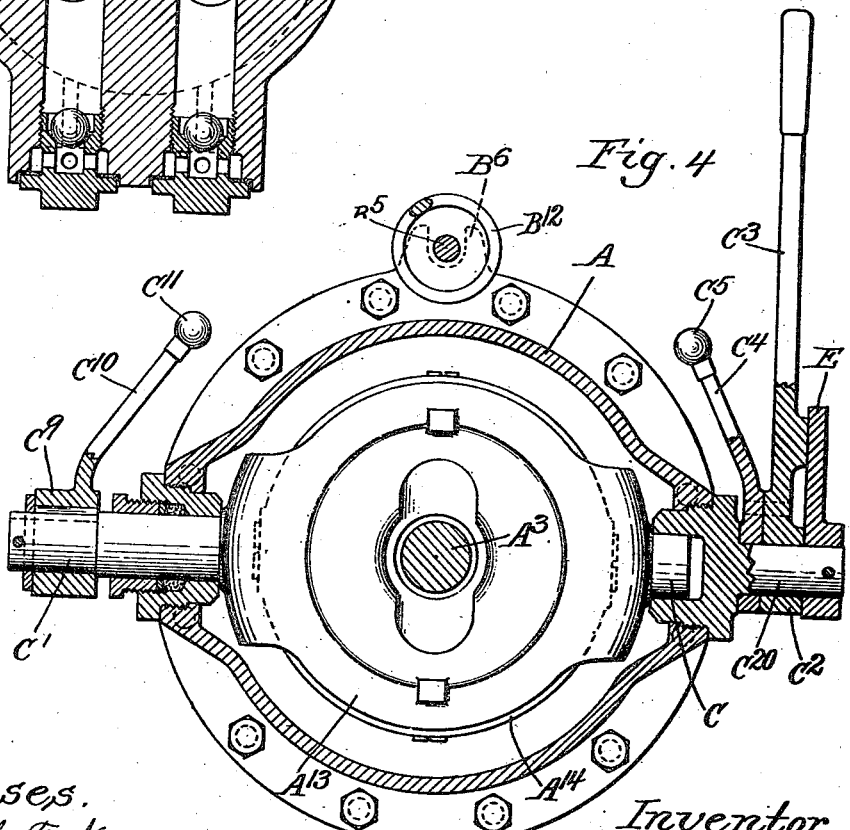

WILLIAM E. MAGIE, OF EVANSVILLE, INDIANA.

CONTROL-GEAR FOR HYDRAULIC TRANSMISSION.

1,299,751.  Specification of Letters Patent.  Patented Apr. 8, 1919.

Application filed October 4, 1915. Serial No. 53,861.

*To all whom it may concern:*

Be it known that I, WILLIAM E. MAGIE, a citizen of the United States, residing at Evansville, in the county of Vanderburg and State of Indiana, have invented a certain new and useful Improvement in Control-Gears for Hydraulic Transmissions, of which the following is a specification.

My invention relates to improvements in control gears for hydraulic transmissions and has for one object to provide means for protecting both transmission and the prime mover against undue and dangerous overloads. Another object is to automatically correlate the rotational speeds of the pump and motor sides of the transmission to enable the prime mover to operate under proper power conditions at all times. Another object is to provide means for dispensing with any safety valves in the hydraulic transmission system. Other objects of my invention will appear in the specification. I have illustrated my invention as applied to a hydraulic transmission of the so-called axial type in which a series of pump cylinders arranged axially forces the motive fluid into a series of motive cylinders also arranged axially. The motive fluid thus circulates through the system made up of the motive and pump system and controlling and communicating members. The amount of work done by the pump is a function of its discharge and the pressure against which it discharges. In this type of machine the pump is a so-called variable displacement pump. The pistons are caused to reciprocate in the cylinder by means of a rotating inclined swash plate. The displacement of the pump for each revolution depends on the inclination of the swash plate. If the swash plate is perpendicular to the rotating drive shaft no discharge takes place because no piston movement occurs. As the inclination of the swash plate with respect to the axis of the shaft increases the stroke of each piston increases and the displacement of the pump thus is increased. The system is a closed system and the swash plate may be tilted in either direction so as to give a forward or reverse movement of the motive fluid through the system.

Hydraulic transmissions are rated to give their normal power out-put at a certain predetermined number of revolutions and at a certain predetermined pressure. This pressure I call $P^2$ and it may be defined as the highest working pressure at which the machine is intended to operate when handling the maximum quantity of motive fluid. Hydraulic transmissions, however, are frequently subject to severe overloads such as in starting and reversing machinery and the like. In order that they may carry such overloads they are designed to operate under some circumstances at a maximum overload pressure which I have called $P^1$. This is the highest pressure to which it is considered safe to subject the machine. It has been customary in the past to provide hydraulic transmissions with a safety valve set for this overload pressure $P^1$ and so one object of my invention is to provide means which may be substituted for the safety valve without any danger to the machine.

Generally speaking, $P^1$ would be about twice as great as $P^2$. Assuming for instance that the prime mover is adapted to work at its best at 1000 R. P. M. it would be direct connected to the pump shaft and the pump would operate at 1000 R. P. M. If the machine were designed to displace 100-cu. inches of motive fluid per revolution at 500# per square inch pressure we would have a machine rated at 125-H. P. If this machine were provided with a safety valve the valve would be set to release at about 1000# per square inch so as to give the machine a suitable margin of safety to enable it to move or take momentary over loads and starting loads.

If the device is equipped with a safety valve there is nothing to prevent the operator from tilting the swash plate so as to give the maximum pump stroke 100-cu. inches of water per revolution. If he no longer manipulates the lever and leaves it in this position any excessive resistance may run the pressure to over 1000# per square inch, whereupon the safety valve opens and the motive fluid instead of being pumped through the motor and performing useful work will be forced through the safety valve controlled relief aperture. All of the energy conveyed by this fluid, which if the motor were operating would be employed in doing useful work, will be converted into heat as the fluid passes out through the relief opening. This will cause over heating and boiling of the motive fluid and possibly destruction of the machine. The hydraulic motor if the resistance continued would, of course, during this time be at rest and the prime mover would continue its movement against the heavy over load being thus compelled to double its rate of capacity.

In my preferred form of improvement of control the safety valve is eliminated and a control gear provided whose function is to prevent the discharge by the pump of motive fluid in such quantity or under such a pressure as not to conform to the two following requirements:

(1) The pressure of the oil must at no time exceed the maximum safe pressure $P^1$.

(2) The power delivered by the pump (function of pressure times displacement) must never exceed the power which the prime mover is designed to furnish.

This control gear automatically takes care of both of these points, thus preventing both overloading and overheating of the machine, preventing waste of power, and only interfering with the manipulation of the operator when such interference is necessary to accomplish these objects. In other words, it leaves the operator entire freedom of action but makes the machine fool proof.

My invention is more or less diagrammatically illustrated in the accompanying drawings, wherein—

Figure 1 is a plan view;

Fig. 2 is a longitudinal part section and part elevation on a plane at right angles to the plane of Fig. 1 along the line 2—2 of Fig. 1.

Fig. 3 is a section on the line 3—3 of Fig. 1.

Fig. 4 is a section along the line 4—4 of Fig. 2.

Fig. 5 is a section along the line 5—5 of Fig. 3.

Fig. 6 is a detail section along the line 6—6 of Fig. 3.

Like parts are indicated by like letters throughout the several figures.

A is a pump housing; $A^1$ a motor housing, and $A^2$ a connection between them. $A^3$ is a pump shaft driven by any suitable prime mover not here shown; $A^4$ the motor shaft driving any suitable resistance not here shown. $A^5$ is a motor cylinder barrel containing cylinders $A^6$ and pistons $A^7$ which coöperate to drive the shaft $A^4$ by any suitable connections not here illustrated. $A^8$ is a pump cylinder barrel containing the cylinders $A^9$ and pistons $A^{10}$. These pistons are driven through the medium of connecting rods $A^{11}$ from the rotating swash plate $A^{12}$ which plate is driven by the shaft $A^3$ through the universal joint $A^{14}$.

B is a valve plate interposed between the opposed ends of the cylinders $A^6$, $A^9$. Through it are the two separate ports $B^1$, $B^2$. Either one of them may be an exhaust, the other a discharge port depending on the position of the inclined swash plate. If the shaft $A^3$ rotates in a counter-clockwise direction then with the swash plate tilted in the position shown in full lines the port $B^2$ will be the pressure port and the port $B^1$ the intake port. If the swash plate were tilted in the opposite direction the opposite would be the case. $B^3$ is a control cylinder mounted in the housing $A^2$. In it is a piston $B^4$ free to reciprocate therein. This piston $B^4$ is mounted on a piston rod $B^5$ which passes through the lugs $B^6$, $B^7$ on the housing A. $B^8$, $B^9$ are spring collars resting one of them against the shoulder $B^{10}$, the other against a sleeve $B^{11}$ rigid on the rod $B^5$. These collars press against the lugs $B^6$, $B^7$ and hold between them the spring $B^{12}$ which thus yieldingly resists movement of the piston rod in either direction and yieldingly holds the piston $B^4$ in the central position. $B^{13}$ is a passage leading from the pressure port $B^1$ to the right-hand end of the cylinder $B^3$. $B^{14}$ is a passage leading from the exhaust port $B^2$ to the left-hand end of the cylinder $B^3$.

The cradle $A^{13}$ is provided at either end with stub end shafts C, $C^1$ in bearings in the housing A. $C^2$ is a hub mounted for rotation on the trunnion $C^{20}$ and carrying a hand lever $C^3$. The lever $C^4$ is mounted for rotation with the hand lever $C^3$ and provided with a ball $C^5$ in rotatable engagement with socket $C^6$ on the rod $C^7$. The rod $C^7$ at its opposite end is connected by a ball and socket joint $D^1$ to one end of the cross lever D. The cross lever is pivoted at $D^2$ to the extension $B^{50}$ on the piston rod $B^5$, and is connected at its other end by a ball and socket joint $D^3$ to a rod $C^8$ similar to the rod $C^7$. The hub $C^9$ is keyed to the shaft $C^1$ and carries a lever $C^{10}$ which has a ball $C^{11}$ in rotatable engagement with a socket $C^{12}$ on the opposed end of the rod $C^8$. It will be noted that the axis about which the hand lever and the cradle rotate is also the central axis of the universal joint connecting the swash plate and the shaft.

E is a friction quadrant in engagement with the hand lever whereby that lever will be held always in the position which is left by the hand of the operator.

It will be evident that while I have shown in my drawings an operative device, still many changes might be made both in size, shape and arrangement of parts without departing from the spirit of my invention and I wish, therefore, that my drawings be regarded as in a sense diagrammatic.

The use and operation of my invention is as follows:—

With the prime mover in operation rotating the shaft and thus the swash plate and with the swash plate in its neutral position perpendicular to the shaft the piston barrel, the swash plate cylinders and all the moving parts of the pump will be in rotation, but since the swash plate is not inclined to the shaft the pistons will not move in the cylinders and the pump will not then displace any motive fluid. The operator in order to start the load will swing the hand lever away from the central position. This will cause the cross lever to rotate about its pivotal point on the end of the control piston rod in a clockwise direction thus rotating the arm keyed to the stub end shaft and rotating the swash plate into the position shown for forward movement. The pistons will immediately commence to move in their cylinders and pump the motive fluid into the motor. The motor will then commence to move the load connected to it. The load being at rest there will be an immediate increase in pressure in the system. This pressure under ordinary circumstances will run up above the normal working pressure. When it does this the pressure in the control cylinder will force the control piston to the left against the tension of the spring. Since the manual control lever will not be moved the cross lever will rotate about its pivotal connection with the hand lever and the swash plate will be moved by the rotation of the free end of the cross lever back toward the central position. This movement may continue as the pressure rises until the piston has moved sufficiently toward the end of the cylinder when the swash plate will have been returned to the zero position. Under ordinary circumstances, however, as the piston movement gradually occurs toward the end and the swash plate is gradually tilted the decrease in displacement of the pump will be sufficient to hold the pressure down to a safe maximum and as the motor gradually takes up this load and accelerates it the pressure will decrease. As this pressure decreases the spring will gradually move the piston back to the central position until when the load is under way the pump will again operate at its point of maximum efficiency; viz: with maximum displacement at its predetermined pressure.

If during operation any sudden resistance should be encountered the same thing will happen. As the pressure rises the piston will be moved by pressure sufficient to overcome the spring and to gradually tilt the swash plate, and decrease the displacement of the pump so as to hold the pressure down below the danger point.

The same situation exactly will prevail if the hand lever were shifted in the opposite direction. The cross lever would still rotate about its pivotal point and would still be free to control the inclination of the swash plate with the hand lever at rest when the piston is moved by the pressure. In case of sudden reversal, if, for instance the operator moves the lever from the extreme left to the extreme right-hand position suddenly rocking the swash plate through the zero position to the reverse, the changes in pressure will be cared for in substantially the same manner. If this reversing movement is made suddenly, the direction in which the pump would circulate the motive fluid would be instantly reversed. If the transmission is carrying a heavy inertia load the pressure in the ports $B^1$ and $B^2$ will reverse, if the yoke is moved toward the reverse position any faster than the load driven by the transmission will slow down from its own frictional resistance, and the back pressure. For instance, let us assume that the hydraulic motor carries a heavy flywheel, running at maximum forward speed with the yoke in position $Y^1$. If the operating lever is suddenly thrown to the opposite position the yoke will suddenly begin to follow the operating lever, starting toward the position $Y^2$. As soon as it has moved a very short distance it shortens the stroke of the pump so that the pump is no longer delivering oil to the hydraulic motor at the speed corresponding to the speed at which the motor and fly-wheel are running. The motor will therefore be passing oil through into the exhaust port faster than the pump with its reduced stroke can receive it. This instantly reverses the functions of the ports, raising a pressure in the former exhaust port and reducing the pressure in the former pressure port. In this condition the hydraulic motor is driving the pump, and the pressure in the exhaust port is acting to check the speed of the fly-wheel and gradually reverse its motion. The amount of this pressure in the exhaust port will depend on the inertia of the fly-wheel to be reversed, and on the rate at which the operating lever is moved toward the reverse position. During the time of reversal the energy of the fly-wheel will be partly dissipated through the frictional resistance of the mechanism. The remainder of the kinetic energy must be transferred to some other moving body. This is done through the pressure of the liquid in the exhaust port, reacting against the pump pistons and tending to increase the speed of the pump and its prime mover. If the inertia of the pump and prime mover are large and their speed variations therefore moderate, a considerable interval of time will be occupied in the transference of the kinetic energy necessary to the reversal. The reversal may be accomplished by a slow uniform movement of the operating lever, gradually shortening the stroke of the pump. The operating lever may be moved just fast enough to maintain a pressure in exhaust port equal to $P^2$. In this case the piston will not move from the center and the time of reversal will be the time required for the torque corresponding to pressure $P^2$ to absorb the energy. If the operating lever be moved faster than this the pressure will rise above $P^2$ toward the maximum pressure $P^1$, in which case the spring will be somewhat compressed and the movement of piston will modify the position assumed by the yoke. If the operating lever is suddenly thrown over to extreme reverse position, shortening the stroke of the pump, and reversing the action of the pump, a great deal faster than the motor and fly-wheel can accommodate themselves to the change, the pressure in the exhaust port would quickly rise to $P^1$, pushing the piston to the extreme right hand end of the cylinder, and bringing the tilting yoke almost to its original position $Y^1$, from which the reversing movement was started, notwithstanding that the hand lever remains at full reverse. When this condition is established the automatic control takes entire charge of the completion of the reversal, the spring pushing the piston back toward central position as the pressure gradually falls, due to the gradual change in speed of the hydraulic motor and fly-wheel. When the piston has returned half way to the middle position the motor shaft and fly-wheel have come to rest and are just beginning their acceleration in the reverse direction, the speed again increasing and finally reaching full reverse speed as the piston returns to middle position and the pressure has fallen to $P^2$.

In the case of a planer where the internal friction is comparatively large and the speed of the heavy parts comparatively slow such a reversal may take place very quickly, as the kinetic energy to be transferred to the prime mover, etc., is small. On the other hand, the reversal of a large fly-wheel would be very slow. In either case, however, the hydraulic transmission itself is absolutely protected from excess of pressure and from overheating. Such a transmission could be placed in a motor railway car or locomotive, interposed between the prime motor and driving wheels. Assuming a constant speed prime mover, as an electric motor, gasolene engine, or high speed steam engine, it would only be necessary when starting from station for the operator to immediately throw the lever into full speed ahead. The control cylinder would promptly compensate this movement and automatically keep the transmission working at the highest practicable pressure to accelerate the train in the least possible time.

Experience shows that with the above control it is necessary to provide a prime mover which will deliver 50% above the normal rated power of the transmission, to enable the operator to place the control lever at full speed, and let the entire apparatus adjust itself automatically to load conditions. If prime mover is a constant speed machine the pump will deliver the quantity of oil for which it is adjusted and maintain the corresponding speed of the hydraulic motor at any pressure below $P^2$. Above $P^2$ it will reduce the speed of the hydraulic motor as the pressure rises, thus keeping within the capacity of the prime mover. An automobile so equipped would approach a hill at full speed and would go over the various grades of the hill in inversely varying rates of speed, using at all times the maximum power of the gas engine or other prime mover.

It will be noted that as the swash plate or yoke is tilted and the displacement of the plate decreases the speed at which the motor operates will also decrease and this, of course, will give the operator warning that he is working above the rated capacity of the machine. If he does not act accordingly and the pressure continues to increase the pump will be finally drawn to a standstill.

The automatic friction control rocking means for the hand lever insures that as soon as the lever is released by the hand of the operator it remains in the position left by him so that when the automatic control operates the hand lever controlled or positioned fulcrum of the cross lever will not vary, thus the operation of the automatic control does not depend in any way upon the hand lever.

I claim:

1. The combination with a transmission mechanism of a driving shaft therefor, means for controlling the operation of the transmission mechanism, a floating lever and a connection between it and such controlling means, a manually operated control lever and a connection between it and the floating lever, a member movable in response to conditions prevailing within the transmission mechanism and a connection between it and the floating lever.

2. A hydraulic transmission comprising a pump and means for varying its displacement, a motor and circulatory system including the pump and the motor, a control cylinder in communication with said system, a piston therein and an operating connection between it and the displacement varying means, a manual control member and a connection between it and the displacement means, said piston connection and said manual control being each free to operate the displacement varying means independent one from the other.

3. A hydraulic transmission comprising a pump and means for varying its displacement, a motor and circulatory system including the pump and the motor, a control cylinder in communication with said system, a piston therein and an operating connection between it and the displacement varying means and yielding means for resisting the movement of said piston, a manual control member and a connection between it and the displacement varying means, said piston displacement connection and said manual control being each free to operate the displacement varying means independently one from the other.

4. The combination with a pump of a driving swash plate mounted to rock about an axis perpendicular to the axis of the pump of means for rocking it comprising a lever mounted for movement therewith, a floating lever connected thereto, a hand control member and connection between it and the floating lever and a normally fixed fulcrum for the floating lever.

5. The combination with a pump of a driving swash plate mounted to rock about an axis perpendicular to the axis of the pump of means for rocking it comprising a lever mounted for movement therewith, a floating lever connected thereto, a hand control member and connection between it and the floating lever, a normally fixed fulcrum for the floating lever and means responsive to the pressure in the pump for displacing said fulcrum.

6. The combination with a pump of a driving swash plate mounted to rock about an axis perpendicular to the axis of the pump of means for rocking it comprising a lever mounted for movement therewith, a floating lever connected thereto, a hand control member and connection between it and the floating lever, a normally fixed fulcrum for the floating lever and means responsive to the pressure in the pump for displacing said fulcrum, said means comprising a control cylinder and hydraulic connection between it and the pump system, a piston therein and a connection between it and the fulcrum.

7. The combination with a pump of a driving swash plate mounted to rock about an axis perpendicular to the axis of the pump of means for rocking it comprising a lever mounted for movement therewith, a floating lever connected thereto, a hand control member and connection between it and the floating lever, a normally fixed fulcrum for the floating lever and means responsive to the pressure in the pump for displacing said fulcrum, said means comprising a control cylinder and hydraulic connection between it and the pump system, a piston therein and a connection between it and the fulcrum and yielding means for resisting the movement of said piston.

8. The combination with a pump of a driving swash plate mounted to rock about an axis perpendicular to the axis of the pump of means for rocking it comprising a lever mounted for movement therewith, a floating lever connected thereto, a hand control member and connection between it and the floating lever and a normally fixed fulcrum for the floating lever, the fulcrum being located substantially at the mid point of the floating lever.

9. The combination with a pump of a driving swash plate mounted to rock about an axis perpendicular to the axis of the pump of means for rocking it comprising a lever mounted for movement therewith, a floating lever connected thereto, a hand control member and connection between it and the floating lever, a normally fixed fulcrum for the floating lever and means responsive to the pressure in the pump for displacing said fulcrum, the fulcrum being located substantially at the mid point of the floating lever.

10. The combination with a pump of a driving swash plate mounted to rock about an axis perpendicular to the axis of the pump of means for rocking it comprising a lever mounted for movement therewith, a floating lever connected thereto, a hand control member and connection between it and the floating lever, a normally fixed fulcrum for the floating lever and means responsive to the pressure in the pump for displacing said fulcrum, said means comprising a control cylinder and hydraulic connection between it and the pump system, a piston therein and a connection between it and the fulcrum, the fulcrum being located substantially at the mid point of the floating lever.

11. The combination with a pump of a driving swash plate mounted to rock about an axis perpendicular to the axis of the pump of means for rocking it comprising a lever mounted for movement therewith, a floating lever connected thereto, a hand control member and connection between it and the floating lever, a normally fixed fulcrum for the floating lever and means responsive to the pressure in the pump for displacing said fulcrum, said means comprising a control cylinder and hydraulic connection between it and the pump system, a piston therein and a connection between it and the fulcrum and yielding means for resisting the movement of said piston, the fulcrum being located substantially at the mid point of the floating lever.

12. The combination with a pump and means for driving it of a plurality of separate independently acting control means for varying displacement without varying the speed thereof, one of said control means being manually operated, the other being automatic, said control means being mutually independent both in operation and in their re-action upon the pump.

13. The combination with a pump and means for driving it of a plurality of separate independently acting control means for varying displacement without varying the speed thereof, one of said control means being manually operated, the other being operated responsive to pressure variations in the pump, said control means being mutually independent both in operation and in their re-action upon the pump.

14. In a hydraulic transmission comprising a pump and means for driving it, means for controlling the operation of the transmission mechanism, comprising a manually operated lever, a control lever directly connected to the pump and normally responsive to the manually operated lever, and automatic means responsive to pressure within the pump for varying the response of the control lever to the position of the manually operated lever, said automatic means and the manually operated lever being mutually independent both in operation and in their reaction upon the pump.

15. In a hydraulic transmission comprising a pump and means for driving it, means for controlling the operation of the transmission mechanism, comprising a manually operated lever, a control lever directly connected to the pump responsive to the manually operated lever, a connection between the two levers, and automatic means responsive to the pressure in the pump, for varying the position of the control lever, independent of the position and operation of the manually controlled lever.

16. In a hydraulic transmission comprising a pump and means for driving it, means for controlling the operation of the transmission mechanism comprising a manually operated lever, a control lever directly connected to the pump and directly responsive to the position of the manually operated lever, a rocking arm interposed between the two levers, connections between the rocking arm and each of the levers, and automatic means responsive to the pressure in the pump for varying the position of the rocking arm and the control lever, independent of the position and operation of the manually controlled lever.

17. In a hydraulic transmission comprising a pump and means for driving it, means for controlling the operation of the transmission mechanism comprising a manually operated lever, a control lever directly connected to the pump, and normally responsive directly to the manually operated lever, a rocking arm interposed between the two levers, connections between the rocking arm and each of the levers, a normally fixed fulcrum for the rocking arm, and automatic means, responsive to the pressure in the pump for varying the position of the fulcrum of the rocking arm, independent of the position of the manually controlled lever.

In testimony whereof I affix my signature in the presence of two witnesses this 10th day of September, 1915.

WILLIAM E. MAGIE.

Witnesses:
W. J. RYAN,
E. K. SWIGART.